US012701291B2

(12) United States Patent
    Pothana

(10) Patent No.: US 12,701,291 B2
(45) Date of Patent: Aug. 4, 2026

(54) AUDIOVISUAL CONTENT WATCHING DETECTION AND FEEDBACK USING A WIRELESS SET TOP BOX

(71) Applicant: Avago Technologies International Sales Pte. Limited, Singapore (SG)

(72) Inventor: Sai Krishna Pothana, Fremont, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 2 days.

(21) Appl. No.: 18/790,443

(22) Filed: Jul. 31, 2024

(65) Prior Publication Data

US 2026/0039906 A1    Feb. 5, 2026

(51) Int. Cl.
    *H04N 21/442* (2011.01)
    *H04N 21/466* (2011.01)
    *H04N 21/81* (2011.01)

(52) U.S. Cl.
    CPC ... *H04N 21/44218* (2013.01); *H04N 21/4662* (2013.01); *H04N 21/812* (2013.01)

(58) Field of Classification Search
    CPC ......... H04N 21/44218; H04N 21/4662; H04N 21/812; H04N 21/4666; H04N 21/4394; H04N 21/439; H04N 9/802; H04N 21/233
    USPC .......................................... 725/12
    See application file for complete search history.

(56) References Cited

U.S. PATENT DOCUMENTS

| | | | | |
|---|---|---|---|---|
| 10,764,634 | B1* | 9/2020 | Krieger | H04N 21/4667 |
| 2005/0038749 | A1* | 2/2005 | Fitch | H04N 21/4223 |
| | | | | 348/E7.06 |
| 2008/0109843 | A1* | 5/2008 | Ullah | H04N 21/812 |
| | | | | 725/34 |
| 2016/0300135 | A1* | 10/2016 | Moudy | G06N 3/08 |
| 2019/0191214 | A1* | 6/2019 | Mandavilli | H04N 21/454 |
| 2020/0296463 | A1* | 9/2020 | Martinez | H04N 21/812 |
| 2022/0224967 | A1* | 7/2022 | Kirkovich | H04N 21/4852 |
| 2023/0087963 | A1* | 3/2023 | Doken | H04N 21/43615 |
| | | | | 725/12 |
| 2023/0119954 | A1* | 4/2023 | Madwed | G06F 3/167 |
| | | | | 704/9 |
| 2023/0209132 | A1* | 6/2023 | Woodruff | H04N 21/44218 |
| | | | | 725/11 |

* cited by examiner

*Primary Examiner* — Cynthia M Fogg
(74) *Attorney, Agent, or Firm* — Kim & Stewart LLP

(57) ABSTRACT

A wireless set top box (STB) determines whether a user is watching an advertisement on a display device. When playback of the advertisement starts, the STB requests a router to determine the presence of the user, and the router determines the presence by performing sensing (such as Wi-Fi sensing) in conjunction with using a machine learning model. The router sends a response to the STB that indicates whether the user is present. The STB uses the response in combination with various events detected by the STB to determine whether the user is watching the advertisement. The STB also analyzes feedback from the user to determine whether the user has a positive or negative sentiment towards the advertisement.

20 Claims, 6 Drawing Sheets

100

STB <u>10</u>

System Software <u>35</u>

Hardware Platform <u>20</u>

CPU(s) <u>22</u>

Support Circuits <u>26</u>

Local Storage Devices <u>29</u>

Memory <u>24</u>

Firmware <u>28</u>

Communication <u>30</u>

16

Display Device(s) <u>32</u>

Router <u>34</u>

AUDIOVISUAL CONTENT WATCHING DETECTION AND FEEDBACK USING A WIRELESS SET TOP BOX

BACKGROUND

Audiovisual (AV) content may be provided to users (e.g., viewers, consumers, subscribers, etc.) via platforms such as broadcast platforms (e.g., live broadcasts), streaming platforms (e.g., over-the-top (OTT) platforms and the like), and various other AV systems that use one or more networks (including wired or wireless networks, the Internet, etc.) to deliver the AV content to users.

Advertisements are one type of AV content that may be provided to users, such as advertisements that are presented to users in conjunction with an AV program. For example, commercials may be presented to users during a commercial break of a broadcast of a television show.

Usually in AV systems, advertisement slots are made available for use by product/service promoters, vendors, or other interested parties. For instance, a company or other advertiser may purchase an advertisement slot that is placed before, during, or after the presentation (e.g., broadcast, streaming, etc.) of a television show, for purposes of showing an advertisement for the company's goods or services during the slot. In the case of a live presentation, generic advertisements may be shown during the slots. In the case of OTT, targeted advertisements may be inserted in the slots based on the user's interests.

Generally, such advertisers have no way of knowing if a user is watching an advertisement during the AV presentation such as a live broadcast, OTT stream, etc. Furthermore, the advertisers also generally have no way of discerning a user's sentiment while watching an advertisement, such as whether the user has reacted positively or negatively to the advertisement. This lack of knowledge of whether the user is watching the advertisement or lack of knowledge of the user's sentiments are disadvantageous for a number of reasons.

For example, advertisers will not know if their money is being well spent on particular advertisement slots—it is impractical for a promoter to continue to pay for an advertisement slot, if few users are watching the advertisement that is being shown during the slot. As another example, the lack of knowledge of users' sentiments or whether advertisements are being watched inhibit the capability of advertisers to customize the subject matter, timing, duration, or other characteristics associated with the advertisements so as to better match the viewing audience.

SUMMARY

In an embodiment, a first device comprises an antenna to enable the first device to establish a wireless connection with a second device; a port communicatively coupled to a display device and configured to provide audio visual (AV) content received by the first device to the display device for presentation by the display device; a processor; at least one non-transitory computer-readable medium coupled to the processor; and a program stored on the at least one computer-readable medium and executable by the processor to: identify a start of playback of the AV content; in response to identification of the start of the playback of the AV content, send a request signal to the second device via the wireless connection to instruct the second device to determine whether a user is present in an environment where the display device is located; receive, via the wireless connection from the second device, a response signal that indicates whether the user is present in the environment; based on the response signal being indicative that the user is present in the environment and based on at least one event identified by the program, determine that the AV content presented on the display device is being watched by the user; and generate a report to notify a provider of the AV content that the AV content has been watched by the user.

In an embodiment, a method performed by a first device comprises: establishing, by the first device, a wireless connection with a second device; identifying, by the first device, a start of playback of audio visual (AV) content for presentation by a display device communicatively coupled to the first device; in response to identifying the start of the playback of the AV content, sending, by the first device to the second device via the wireless connection, a request signal to instruct the second device to determine whether a user is present in an environment where the display device is located; receiving, by the first device from the second device via the wireless connection, a response signal that indicates whether the user is present in the environment; based on the response signal being indicative that the user is present in the environment and based on at least one event identified by the first device, determining, by the first device, that the AV content presented on the display device is being watched by the user; and generating, by the first device, a report to notify a provider of the AV content that the AV content has been watched by the user.

In an embodiment, in an environment that includes a first device and a second device, a method is performed by the second device to enable the first device to determine whether audiovisual (AV) content is being watched by a user. The method comprises: establishing, by the second device, a wireless connection between the second device and the first device; sending, by the second device to the first device via the wireless connection, the AV content for presentation by a display device communicatively coupled to the second device; capturing, by the second device, characteristics associated with the wireless connection; receiving, by the second device from the first device via the wireless connection, a request signal that instructs the second device to perform sensing to determine whether the user is present in the environment; in response to the request signal, performing, by the second device, the sensing by using the captured characteristics and a machine learning model to determine that the user is present in the environment and to generate a response signal that indicates that the user is present; and sending, by the second device to the first device via the wireless connection, the response signal to enable the first device to use the response signal in combination with at least one event to determine that the AV content presented on the display device is being watched by the user.

DETAILED DESCRIPTION

The embodiments disclosed herein provide techniques to determine whether a user (e.g., a viewer, subscriber, consumer, etc.) is watching audiovisual (AV) content, such as an advertisement that is provided in conjunction with an AV presentation (e.g., a movie, television show, streaming content, podcast, live broadcast, or other type of AV presentation). The embodiments disclosed herein also determine a sentiment (e.g., a positive reaction, a negative reaction, or other emotional reaction) of the user in response to the advertisement.

In accordance with various embodiments, an environment of the user (such as a home, office, conference room, lobby, event room, etc.) may be provided with a set top box (STB) and a router that may be communicatively coupled to each other. The STB may be communicatively coupled to a display device configured to present AV content (including AV programs and advertisements), such as a television or other type of device having a display screen. The router and STB may cooperate with each other to use a plurality of indicators (e.g., cues/events or other types of inputs that may be provided by data/signals) to determine whether the user is watching the advertisement and to determine feedback of the user (such as the user's sentiment in response to the advertisement), using the techniques that will be described in detail below.

Figure 1:
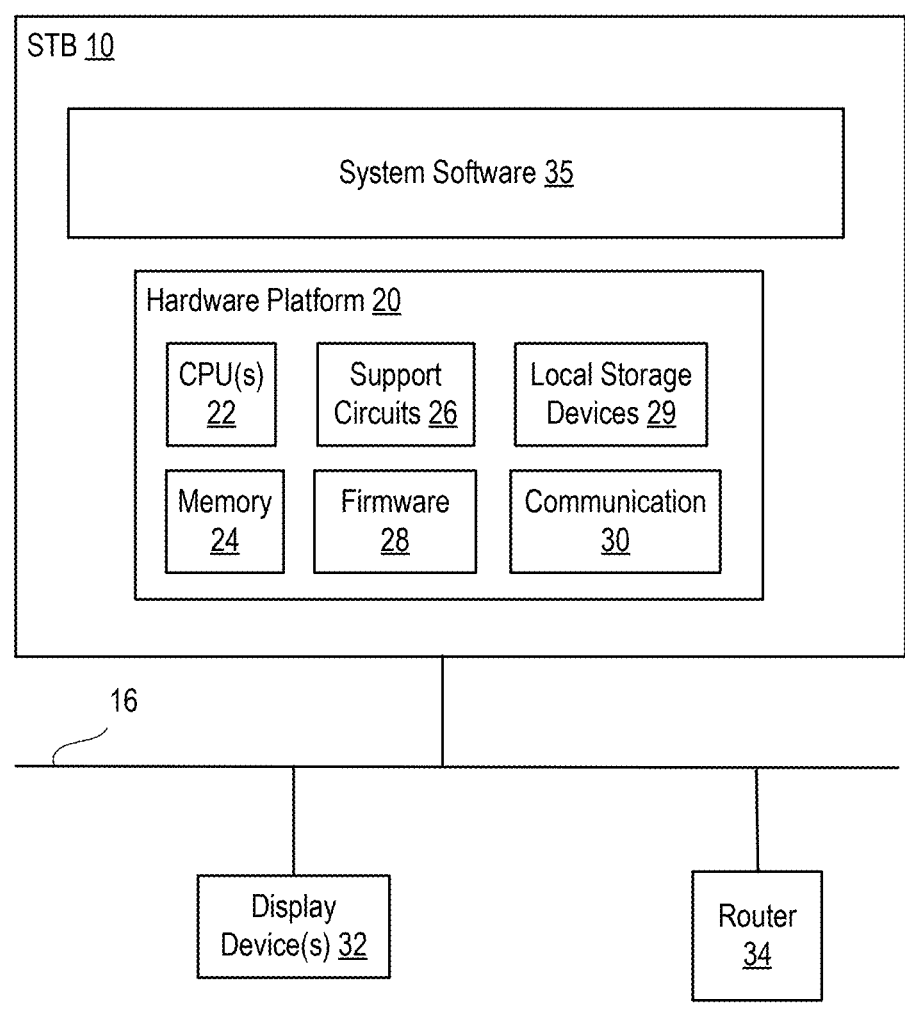
FIG. 1 is a block diagram depicting an example system according to embodiments.

FIG. 1 is a block diagram depicting an example system 100 according to embodiments. The system 100 may be disposed in an environment of a user, such as in a home, office, or other private or public location. The system 100 may include at least one first apparatus or first device such as a set top box (STB) 10 or other analogous device configured to receive AV signals (such as broadcast signals, streaming signals, etc.) having AV content and to process such signal(s) appropriately for presentation of the AV content on one or more display devices 32 that is communicatively coupled to the STB 10.

The STB 10 may comprise system software 35 executing on a hardware platform 20. The hardware platform 20 may include components of a computing device, such as one or more processors (e.g., central processing units (CPUs) 22), memory 24, communication components 30, firmware 28, support circuits 26, and local storage devices 29. The CPU 22 may be configured to execute computer-readable instructions (for example, an application that is executable to perform one or more operations described herein), which may be stored in the memory 24 or the local storage device(s) 29. The communication components 30 may include one or more receivers, transceivers, modulators, demodulators, multiplexers, demultiplexers, tuners, antennas, network and device interfaces, ports, etc. to support wired and wireless communications, and to enable the STB 10 to communicate with other devices using suitable communication protocols and techniques (e.g., Ethernet, Transmission Control Protocol/Internet Protocol (TCP/IP), Bluetooth, Wi-Fi, and so forth). As an example, the communication components 30 can include a port to enable the STB 10 to be connected via a connection 16 (e.g., a high-definition multimedia interface (HDMI) connection or other type of wired or wireless connection) to the display device 32.

The STB 10 may be further communicatively coupled to a router 34 or other types of devices or networks. For example, if the STB 10 is a wireless STB, the connection 16 may include a wireless link (e.g., a Wi-Fi connection) that communicatively couples the STB 10 to the router 34, and the router 34 in turn has communication access to an external network, such as a cloud, the Internet, networks/devices operated by a multiple system operator (MSO) or content providers or other entities, or other networks/devices external to and remote from the system 100.

The local storage devices 29 may include magnetic disks, solid-state disks, flash memory, and the like as well as combinations thereof. The support circuits 26 include various circuits that facilitate operation of the hardware platform 20, such as power supplies, chipsets, input/output (IO) circuits, coders/decoders, and the like. The firmware 28 may include instructions and configuration data for configuring the hardware platform 20 upon power on until handing off execution to the system software 35. Although shown as separate blocks in FIG. 1, one or more of the communication components 30, support circuits 26, firmware 28, etc. may be part of the same block(s).

In some embodiments, the router 34 may be a second apparatus or second device that has the same or analogous components as the STB 10 shown in FIG. 1, such as CPUs, memory, storage devices, support circuits, communication components, etc. A difference is that some of these components in the router 34 are configured to perform router-related operations, as compared to the STB-related operations performed by components of the STB 10. For the sake of simplicity and brevity, such components that can comprise parts of the router 34 are not shown or described in further detail in FIG. 1.

The system software 35 can include a host operating system (OS), one or more applications, drivers, code to support operation of the various components of the hardware platform 20, media players, and other computer-readable instructions stored on one or more computer-readable media (such as the memory 24 and/or storage device 29) and executable by the one or more processors (such as the CPU 22). According to various embodiments, the system software 35 can include a detection application configured to detect or otherwise determine the presence of one or more users for purposes of ascertaining whether AV content (such as an advertisement) is being watched by the user(s). The detection application and/or some other application residing in the STB 10 can also be configured to process feedback from the user(s), so as to ascertain a sentiment of the user(s) in response to the advertisement. The detection application and/or some other application residing in the STB 10 may further be configured to use machine learning techniques or otherwise operate in conjunction with machine learning components to determine presence and sentiment.

With respect to detecting whether a user is watching an advertisement and in accordance with various embodiments, a wireless router (e.g., the router 34) and a wireless STB (e.g., the STB 10) may be located at an environment of the user, such as in a media room of the home of the user. A display device (e.g., the display device 32) in the environment may be rendering an AV presentation having AV content (such as an advertisement). A user may be deemed in some embodiments to be watching the advertisement by virtue of the presence of the user being detected in the environment by the STB 10 in cooperation with the router 34 when the advertisement is playing.

The presence of the user may be determined by the STB 10 by analyzing a plurality of events or other analogous types of indicators. Such events may include a Wi-Fi sensing events, voice presence events, remote control activity events, television on/off state events, advertisement start/end cues, or other event(s)/indicator(s) and combinations thereof that provide cues or other data (such as via signals) to the STB 10.

With regards to the Wi-Fi sensing events and the advertisement start/end events, the router 34 of various embodiments can determine human presence in the environment that hosts the STB 10 and router 34 using a Wi-Fi sensing machine-learning (ML) model. For example, Wi-Fi sensing management action frames or other signal format (which can be vendor-specific) can be exchanged between the router 34 and the STB 10, first as a request for human object detection sent from the STB 10 to the router 34 (e.g., when the STB 10 detects that an advertisement starts playing, based on an advertisement start cue), and then the router 34 can use the Wi-Fi sensing ML model to determine the human presence and thereafter send a response (to the STB 10) for human object detection indicating that human presence has been detected.

With regards to the human voice presence events, the STB 10 of various embodiments can detect a human voice in the environment using a human voice detection ML model. With regards to the remote control activity events, the STB 10 knows when a remote control, such as infrared (IR) or Bluetooth (BT) remote controls are being operated-operation of the remote control (as signaled by the remote control activity events) indicates user presence in the environment. With regards to the television on/off state events, an on state of the television as signaled by the on event enables the STB 10 to determine that the user may be present, while an off state of the television as signaled by the off event enables the STB 10 to determine that a user is not (cannot be) watching an advertisement because the television is turned off.

In various embodiments, the STB 10 knows when an advertisement is being played due to advertisement cue descriptors like those provided by SCTE-35 (described later below) or other advertisement start/end indicator. Accordingly, between the times an advertisement starts and ends, the STB 10 can use the various events described herein to check for human body presence, human voice presence, remote control activity, and television on/off state, and send some type of report if the advertisement is determined to not have been watched by the user or determined to have been watched.

With regards to user feedback in response to an advertisement, various embodiments compare the text of the advertisement (such as text available via close captioning or subtitles) with feedback such as captured audio of the user's voice during the playing of the advertisement (e.g., a comment of the user). If there is a correlation or other match that shows a relation between the text of the advertisement and the user's comment, then a sentiment analysis ML model can be used by the STB 10 to determine if the user's comment has a positive or negative sentiment towards the advertisement. Further details of embodiments that analyze the user's feedback are described later below.

Detecting/determining whether an advertisement has been watched and the user's feedback (e.g., sentiment) towards the advertisement provides various technical advantages. For example, the characteristics (e.g., subject matter, timing, duration, etc.) of AV content (such as advertisements) can be adapted based on the interests or behavior of the user. As another example, the analysis of various events, information/data, etc. is performed at the set top box and also the router, which are located in an environment of the user such as a home, thereby preserving and protecting the privacy of the user. As still another example, revenue for multiple system operators (MSOs) and advertisers can be increased, by more efficiently selecting and customizing advertisements that have a high-watch frequency and positive feedback.

Figure 2:
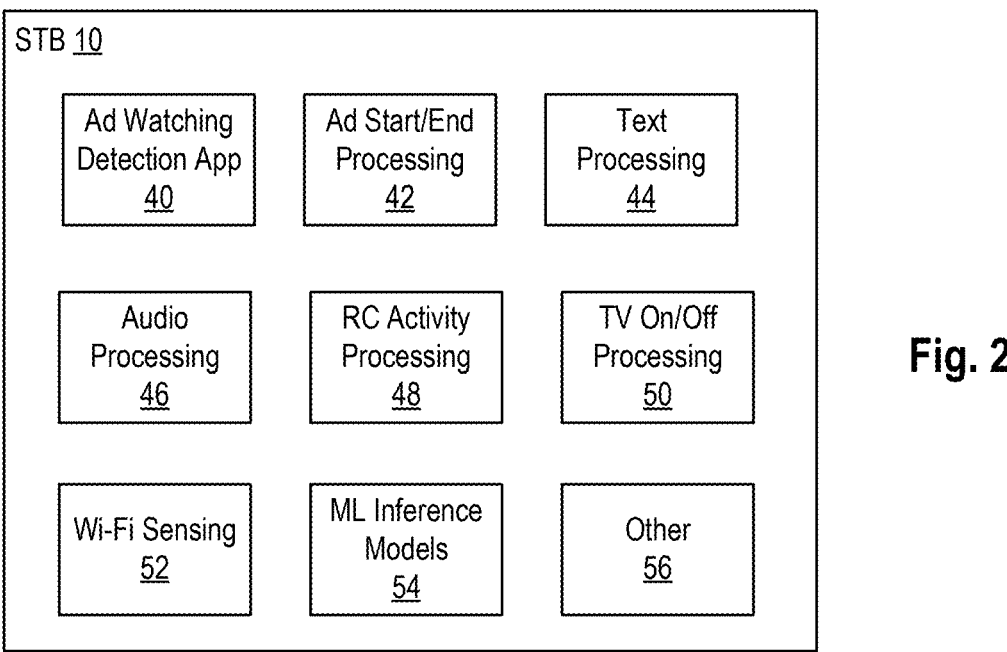
FIG. 2 is a block diagram depicting example features of a set top box (STB) in the system of FIG. 1 according to embodiments.

FIG. 2 is a block diagram depicting example features of the STB 10 in the system 100 of FIG. 1 according to embodiments. More specifically, FIG. 2 illustrates some of the components/functionality of the STB 10 that may be used in connection with determining whether a user is watching an advertisement and further in connection with evaluating user feedback in response to the advertisement. The various features shown in FIG. 2 may be implemented in/by the hardware platform 20 and the system software 35 of FIG. 1.

An advertisement watching detection application 40 may be configured to receive a plurality of events indicative of whether a user is watching an advertisement, analyze the events, and determine a result of the analysis (e.g., watching or not watching). Furthermore, the application 40 may be configured to analyze user feedback in response to the advertisement, if the user has been determined to have been watching the advertisement, so as to determine the sentiment of the user. For the sake of illustration and example, the application 40 is described hereinafter as performing both determination of whether the user is watching and also determination of the feedback of the user—it is to be appreciated that separate applications may be provided in other embodiments to perform these two tasks. The application 40 may further be configured to otherwise coordinate with or control operation of the various other components shown in FIG. 2 and described next.

An advertisement start/end processing component 42 may be configured to detect the start and end times of an advertisement, such as when an advertisement starts playing and stops playing (e.g., a commercial break) during the streaming of an AV program. Various techniques may be used by the advertisement start/end processing component 42 to determine/identify the start/end times.

For example, Society of Cable Telecommunications Engineers standard 35 (SCTE-35) is a standard that defines the insertion of cueing messages for the segmentation of content in digital video streams. SCTE-35 is used in the cable, satellite, and Internet protocol (IP) television industries for managing advertisement insertion, program scheduling, and content blackouts. SCTE-35 is used to signal events such as advertisement breaks, content changes, and program start/stop times within an AV stream. These signals may be typically carried in Motion Picture Expert Group 2 (MPEG-2) transport streams but can be used with other transport techniques like MPEG-2 Dynamic Adaptive Streaming Over Hypertext Transfer Protocol (MPEG2DASH) and HTTP Live Streaming (HLS).

In traditional MPEG-2 Transport Stream (MPEG2TS) broadcasts, SCTE-35 advertisement cue messages are carried in dedicated packet identifier (PID) streams. SCTE-35 cue messages are inserted into a specific PID that is designated for SCTE-35 data and is encapsulated within a Program Specific Information (PSI) section with a table identifier of 0xFC. The PID carrying SCTE-35 data is multiplexed with video and audio PIDs in the transport stream. Cable, satellite, and IP set top boxes (e.g., the advertisement start/end processing component 42 in the STB 10) may be configured to parse the transport stream, identify the PID carrying SCTE-35 data, and extract the advertisement cue messages for processing so as to identify the start and end of an advertisement.

Dynamic Adaptive Streaming Over HTTP (DASH) uses segments of MPEG2TS for streaming. SCTE-35 advertisement cues are included within these segments similarly to how cues are handled in traditional broadcasts. SCTE-35 messages are inserted into the MPEG2TS segments and encapsulated in a PID as described above. The DASH manifest Media Presentation Description (MPD) includes information about the PID carrying SCTE-35 data. This helps a DASH client (e.g., the advertisement start/end processing component 42) in the STB 10 to know where to search for SCTE-35 cues. The advertisement start/end processing component 42 that supports SCTE-35 extracts the cues from the specified PID in the segments and processes them accordingly to determine the start/end of the advertisement.

Similar to DASH, HLS uses segments of MPEG2TS. SCTE-35 messages are inserted into these segments within a specific PID. In addition to including SCTE-35 messages within the MPEG2TS segments, HLS uses playlist tags to signal advertisement breaks and other events. For example, the tag EXT-X-CUE-OUT indicates the start of an advertisement break or a significant event and the tag EXT-X-CUE-IN indicates the end of an advertisement break or a significant event. An HLS playlist (e.g., a M3U8 file) includes these tags to provide instructions for a media player and/or the advertisement start/end processing component 42 as to where the SCTE-35 cues are located within the segments.

Hence, by processing the SCTE-35 and SCTE-214-1 data or other type of cue data provided in conjunction with an AV signal such as a stream or live broadcast, the advertisement start/end processing component 42 of the STB 10 can determine when each advertisement starts and stops, and provide such information to the application 40.

With respect to the text associated with the AV signal, such as close captioning (CC), subtitles, and the like, the STB 10 may include a text processing component 44. The text processing component 44 may be configured to perform, among other things, extraction and processing of text of an advertisement, so that such text can be compared to the text of captured audio (e.g., feedback) of the user. This comparison may be used to determine if the user has watched the advertisement, for example if the context of the user's text matches the context of the text of the advertisement, and also to determine the user's sentiment towards the advertisement (e.g., positive, negative, neutral, etc.).

Closed captioning in MPEG2TS, MPEG-DASH, and HLS is handled through different mechanisms and standards to ensure accessibility and compliance with broadcasting requirements.

With respect to a MPEG2TS broadcast, closed captioning in MPEG2TS broadcasts is typically carried using the EIA-608/EIA-708 standards:

EIA-608 captions: These are the older standards and are often included in the Vertical Ancillary Data (VANC) lines of the video signal. In MPEG2TS, the captions can be carried in the user data section of the picture layer of the video elementary stream.

EIA-708 captions: These are the newer standards for digital television. EIA-708 captions can also be carried in the user data section of the picture layer. These standards offer enhanced features like better character sets, multiple languages, and better formatting.

PID for captions: Closed captions can also be included in a separate PID dedicated to caption data. A Program Map Table (PMT) specifies the PID used for captions.

With respect to MPEG2DASH, closed captioning can be handled in several ways:

Embedded in video stream: Similar to MPEG2TS, closed captions can be embedded in the video stream itself using the EIA-608/EIA-708 standards.

Timed Text Markup Language (TTML): A more common method in DASH is using TTML, also known as W3C TTML or SMPTE-TT. This method allows for rich text formatting and is carried as a separate adaptation set in the DASH manifest (MPD).

Web Video Text Tracks (WebVTT): Another method is using WebVTT, which is a simpler caption format compared to TTML. WebVTT is also carried in a separate adaptation set in the MPD.

Manifest File: The DASH MPD manifest includes information about the available caption tracks, specifying the codecs and the adaptation sets where the caption data can be found.

With respect to HTTP Live Streaming (HLS), HLS uses a slightly different approach for closed captioning as compared to the above techniques:

CEA-608/708 captions: Closed captions using the CEA-608 or CEA-708 standards can be embedded within MPEG-2 TS segments.

WebVTT: HLS also supports WebVTT for captioning. WebVTT files are referenced directly in the HLS playlist (e.g., a M3U8 file).

EXT-X-MEDIA tag: Closed captions in HLS are often indicated using the EXT-X-MEDIA tag in the playlist file. This tag defines the characteristics of the caption track and references the segments where the captions are available.

The foregoing are just some examples of close captioning techniques. The text processing component 44 of various embodiments is able to work in conjunction with the above or other techniques used for providing text along with AV content, so as to locate and extract such text for purposes of further processing and analysis.

The STB 10 may include an audio processing component 46 configured to receive and process audio. For example, a remote control with a microphone may be used to capture raw voice signals from the user and other ambient audio signals in the room. Such audio is then provided to the audio processing component 46, which performs audio signal processing to clean up the audio (e.g., remove noise) and to identify or generate audio features such as zero crossing rate, spectrum centroid, short time energy parameters, or other audio-related information that may then be used as an input to a human voice detection ML model. Such an ML model may be one of the ML inference models 54 residing on the STB 10 that has been trained to classify an audio signal into a human voice and non-human voice. An output of the ML model may be subsequently provided to application 40 to inform the application 40 as to whether a user (human) has been detected in the room due to a human voice presence in the room.

The STB 10 may include a remote control (RC) activity processing component 48 configured to determine whether a button on a remote control has been operated/actuated before or during the advertisement. For example, the STB 10 may be configured with the system software 35 to receive and process key presses of infrared (IR) or Bluetooth (BT)

remote controls. Such key press events can be extracted by the RC activity processing component 48 to check if the remote controls are actively regularly being operated, and such regular operation can be reported by the RC activity processing component 48 to the application 40 to indicate user presence while the advertisement is playing.

The STB 10 may further include a television on/off processing component 50 to determine whether the display device (e.g., a television) is in an active state to receive AV content for presentation to a user. For example, the television on/off processing component 50 may be embodied as a HDMI display module that receives decoded video frames as input and sends the video frames in a chosen resolution as output to a television via an HDMI connection. Such an HDMI display module has the ability to detect if the television is on/off or connected/disconnected based on the HDMI standards, and can report the state of the television to the application 40 for use in determining whether the user is watching an advertisement.

The STB 10 may also further include Wi-Fi sensing components 52. In general, Wi-Fi sensing detects and analyzes the disruptions/changes in the characteristics of existing Wi-Fi signals between connected devices (e.g., Wi-Fi signals between the STB 10 and the router 34). Such disruptions/changes may be analyzed (using a Wi-Fi sensing ML model) to determine whether such disruptions/changes are caused by human presence or by some other object (such as a piece of furniture).

In some embodiments and in the context of Wi-Fi sensing, Wi-Fi sensing ML model resides at the router 34 rather than at the STB 10, due to greater processing capability at the router 34. As such and for these embodiments, the Wi-Fi sensing components 52 at the STB 10 do not themselves check for human presence using Wi-Fi sensing and a corresponding ML engine or ML model, but rather, the Wi-Fi sensing components 52 sends a request signal to the router 34 to check for human presence using the Wi-Fi sensing components and corresponding ML engine/model that reside at the router 34.

For example, the Wi-Fi sensing components 52 at the STB 10 of various embodiment may send a vendor specific Wi-Fi sensing management action frame (or other request signal with some other format) to the router 34 to check for human presence in the room when an advertisement start event is detected. The router 34 may then respond back with Wi-Fi sensing management action frame (or other response signal with some other format) with data as to whether human presence is detected in the room.

As another example, the Wi-Fi sensing components 52 at the STB 10 may use (for the request signal) the IEEE 1905 transport protocol for communication in a wireless mesh network. Similar to Wi-Fi management actions frames, vendor specific IEEE 1905 frames can be used as request and response frames for Wi-Fi sensing as described above, for the exchange of request and response signals between the STB 10 and the router 34.

One or more of the ML inference models 54 may reside at the STB 10 and may be operate in conjunction with the application 40 to use the events (e.g., output such as signals or data) provided by the components 42-52 etc. as inputs to determine user presence when an advertisement is playing and user feedback in response to the advertisement. The outputs of the ML inference models 54 may be provided to the application 40 to enable the application 40 to arrive at a final determination of user presence (which indicates that the user is watching) and user feedback.

The ML inference models 54 may include one or more of the following:

A human voice detection ML model: This ML model may be used to check whether captured audio is a human voice or not. Audio signal processing is performed by the audio processing component 46 on the captured audio to clean up noise and provide audio input features to the ML model like zero crossing rate, spectrum centroid, and short time energy parameters. The output of the ML model would be a determination of a human voice and non-human voice.

Automatic speech recognition (ASR) ML model: This ML model is capable of transcribing spoken language into written text with high accuracy. Input to the ML model may be an audio recording in WAV or other suitable format provided by the audio processing component 46 and/or by some other ML model, and the output of the ML model would be transcribed text.

Semantic similarity ML model: This ML model may be used to generate text embedding for the user's text and the advertisement's text. Input to the ML model may be text provided by the text processing component 44 and/or by some other ML model, and the output of the ML model would be embedding text.

Sentiment analysis ML model: This ML model may be used to determine if the user's comment is positive or negative about an advertisement. Input would be embedded text provided by the text processing component 44 and/or by some other ML model, and the output of the ML model would be a determination of positive or negative sentiment.

The STB 10 may include various other components 56 to support the determination of user presence and user feedback. Such other components can include additional ML inference models or ML engines, biometric sensors, tables and other data structures, additional processing hardware and software, and so forth.

Figure 3:
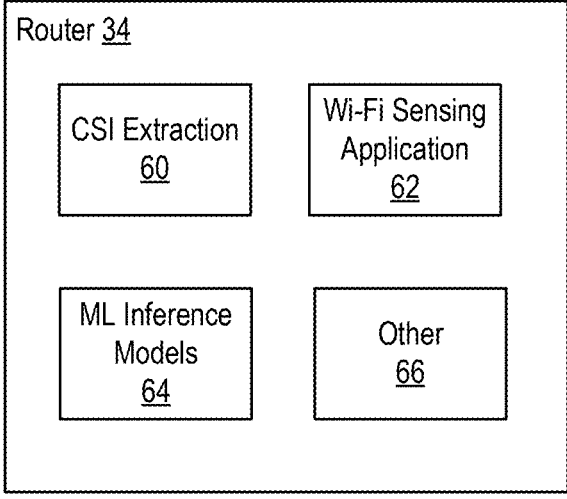
FIG. 3 is a block diagram depicting example features of a router in the system of FIG. 1 according to embodiments.

Reference is now made to FIG. 3 which is a block diagram depicting example features of the router 34 in the system 100 of FIG. 1 according to embodiments. More specifically, FIG. 3 illustrates some of the components/functionality of the router 34 that may be used in connection with determining user presence during playback of an advertisement and further (for some embodiments) in connection with supporting the evaluation by the STB 10 of user feedback in response to the advertisement. The various features shown in FIG. 3 may be implemented in/by components analogous to the hardware platform 20 and the system software 35 of FIG. 1.

The router 34 may include a channel state information (CSI) extraction component 60, a Wi-Fi sensing application 62, one or more ML inference models 64, and other components 66. The CSI extraction component 60 (or analogous component) may be configured to extract information from Wi-Fi signals for use in Wi-Fi sensing. For example, the router 34 may be configured to support the extraction of raw CSI data per antenna corresponding to the STB 10. The raw CSI data may be used to obtain features such amplitude deviation, phase deviations, energy per fast Fourier transform (FFT) bin in the Wi-Fi channel, etc. and such features are fed as input to an already trained Wi-Fi sensing ML model (one of the ML inference models) that infers the presence of humans in a room. The output of the Wi-Fi sensing ML model can be provided to the Wi-Fi sensing application 62.

The Wi-Fi sensing application 62 of various embodiments may be configured to receive Wi-Fi sensing request signals from the STB 10 and to send a Wi-Fi sensing response signals back to the STB 10. For example and as previously explained above, the STB 10 can send a vendor specific Wi-Fi sensing management action frame (or other request signal with some other format) to the router 34 so that the application 62 can check the output of the Wi-Fi sensing ML model as to whether human presence was detected in the last specific time interval, and the application 62 can respond back to the STB 10 with a vendor specific Wi-Fi sensing management action frame (or other response signal with some other format). The Wi-Fi sensing application 62 may also be used in conjunction with IEEE 1905-based mesh networking, by using commands defined in mesh networking standards.

The router 34 may include various other components 66 to support the determination of user presence. Such other components can include additional ML inference models, biometric sensors, tables and other data structures, additional processing hardware and software, and so forth. In some embodiments, such other components 66 can include components alternatively or additionally to those residing in the STB 10 for determining user presence or for determining user feedback in response to an advertisement.

Figure 4:
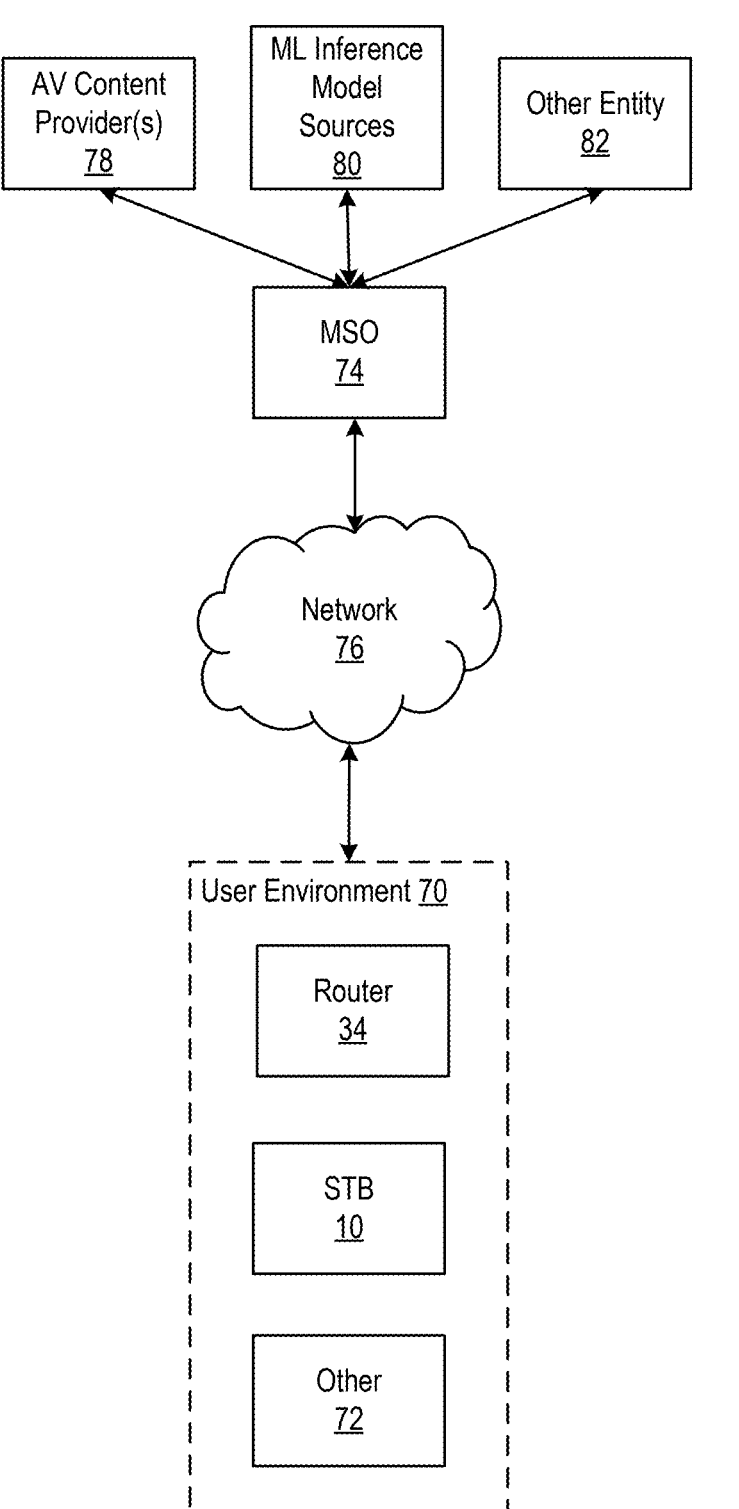
FIG. 4 is a block diagram depicting an example arrangement of entities involved in the delivery and presentation of AV content according to embodiments.

FIG. 4 is a block diagram depicting an example arrangement of entities that may be involved in the delivery and presentation of AV content according to embodiments. The previously described router 34 and STB 10 may reside in an environment 70 of the user, such as at a media room of a home of the user, at an office, at a school, or at some other type of private or public environment. The environment 70 may include other devices 72 that may operate in conjunction with the router 34 and the STB 10, such as a television, network gateway, switch, mobile device, desktop computer, etc.

A multiple system operator (MSO) 74 or other analogous entity may provide AV content such as an AV stream, AV broadcast, advertisements, or other type of AV content to the environment 70 via a network 76. The network 76 may include an infrastructure that is owned, operated, leased, or otherwise used by the MSO 74 to deliver AV content or to otherwise provide products/services for consumption by the user, MSO 74, and other entities. The network 76 may include cloud-based computing resources in some embodiments, such as cloud-based computing nodes and related storage that are remote from the environment 70, for performing ML-related operations, text or audio or other data processing/analysis, determination of human presence and sentiment, etc., alternatively or additionally to such operations/tasks being performed at the environment 70.

The network 76 may include wired and/or wireless networks, including one or more of the Internet, cable links, satellite links, optical links, telephone or cellular links, local area networks (LANs), wide area networks (WANs), etc. In implementations such as for IP STBs or for OTT, the STB 10 may receive the AV content via the router 34. In other implementations such as for cable STBs or satellite STBs, the AV content (including advertisements) may be received via satellite/cable tuners, demodulators, etc. for the STB 10, without necessarily involving a router 34 in the delivery of the AV content to the STB 10.

One or more AV content providers 78 may be in communication with the MSO 74. The AV content providers 78 may include, for example, product/service promoters that purchase advertisement slots in AV broadcasts/streams for presentation of their advertisements, producers of the actual AV programs themselves, public service announcement organizations, etc.

One or more ML inference model sources 80 may also be in communication with the MSO 74. Such sources 80 may provide, for example, ML inference models to the MSO 74 for subsequent delivery to the environment 70 for training and use. Other entities 82 may also be present in the arrangement of FIG. 4, and may or may not necessarily be involved in the delivery of AV content to the environment 70.

While the entities 78-82 are depicted in the example of FIG. 4 as communicating with the environment 70 via the MSO 74, other embodiments may be implemented in which one or more of these entities bypass the MSO 74 so as to communicate directly with the environment 70.

The various communication links depicted in FIG. 4 with double-headed arrows may be wireless or wired communication links. These communication links can use various protocols, standards, or techniques for communication, such as TR-069, HTTP, Simple Network Management Protocol (SNMP), Message Queuing Telemetry Transport (MQTT), Inter-Process Communication (IPC), and so forth.

Figure 5:
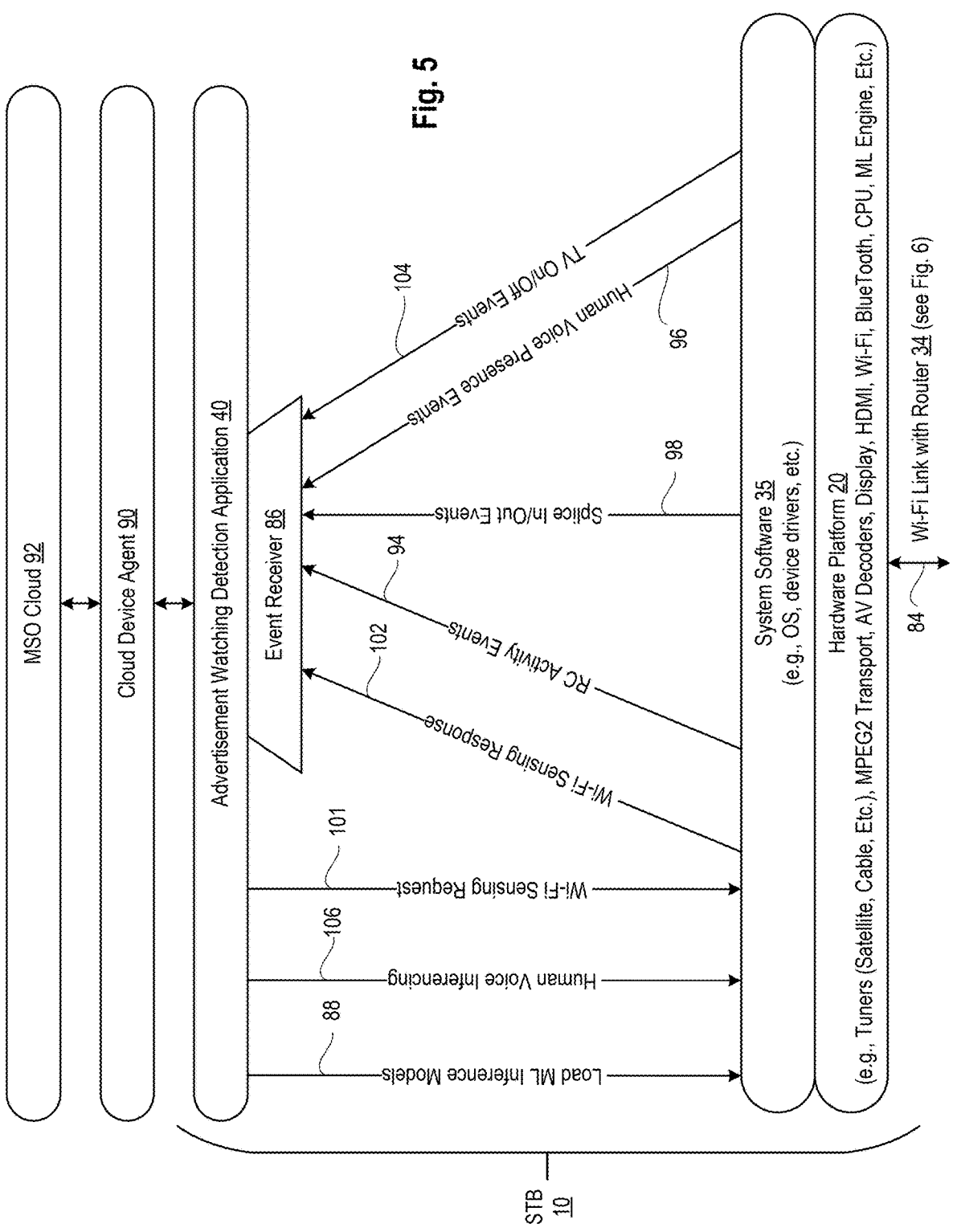
FIGS. 5 and 6 are flow diagrams depicting example operations for advertisement watching detection and feedback determination according to embodiments.
Figure 6:
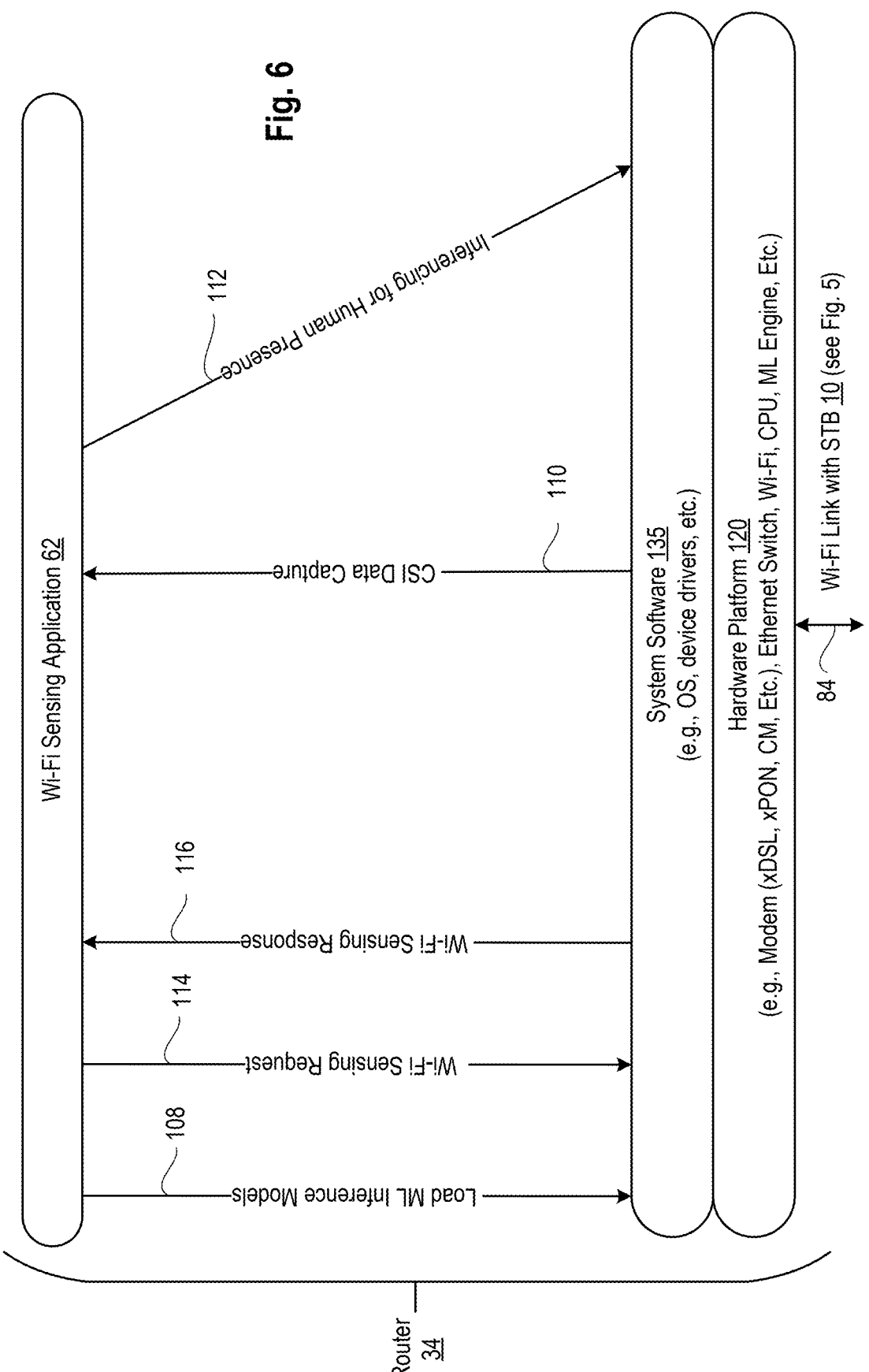

FIGS. 5 and 6 are flow diagrams depicting example operations for advertisement watching detection and feedback determination according to embodiments. FIG. 5 depicts operations that occur at the STB 10, while FIG. 6 depicts operations that occur at the router 34. A Wi-Fi link 84 connects the STB 10 of FIG. 5 to the router 34 of FIG. 6 for communication with each other.

Referring first to FIG. 5, the advertisement watching detection application 40 of the STB 10 has or is otherwise able to access the PSI tables like PMT, SCTE-35 tables for the AV channel on which a user is watching AV content, which could be live, OTT, etc. The application 40 of some embodiments may further include user feedback processing and analysis capability, or user feedback may be analyzed/processed by some other application of the STB 10.

The application 40 further includes or is otherwise coupled to an event receiver 86 that receives various events and other indicators or information from the system software 35. For example, an OS, device drivers, or other code of the system software may report (to the event receiver 86) events that occur or are detected at the hardware platform 20 (such as remote control activity, television on/off states, advertisement start/end (e.g., splice in/out events), Wi-Fi sensing responses that are received from the router 34, etc.), as well as events that occur or are detected at the software level. The event receiver 86 can then pass information regarding these events to the application 40. In some embodiments, the events or other information can be received directly by the application 40, without using or having a specific event receiver 86. The system software 35 may also include code to execute ML algorithms that use the ML inference models 54 and to execute other ML-related operations.

At operation 88, the application 40 loads the various ML inference models 54 of FIG. 2. These ML inference models 54 can be loaded via a cloud device agent 90 and an MSO cloud 92 (which can be components of the MSO 74 or network 76 of FIG. 4), or via from some other source such as the ML inference model sources 80 of FIG. 4. The ML inference models 54 loaded at operation 88 can include one or more of the following:

The human voice detection ML model for an ML engine, which is used to perform inference on the raw voice features to determine if captured audio is a human voice;

The semantic similarity ML model, which is used to infer if the user's comments about advertisement is related to the closed captioning text of the advertisement;

The sentiment analysis ML model, which is used to infer whether the user's comment regarding the advertisement is positive or negative; and The automatic speech recognition ML model, which is used to convert the user's voice recording during the advertisement's playback into text.

The application 40 maintains a history of remote control key actuation and human voice presence events during in a last specific time interval (for example, audio that is captured during each preceding half hour). These events are reported to the event receiver 86 at operation 94 for remote control activity and at operation 96 for human voice presence or other audio presence. These and other events may occur randomly and repeatedly in some situations and are not necessarily related to or dependent upon each other in terms of timing.

At operation 98, a splice in/out event is received, which indicates the start of an advertisement. When this event is triggered, the application 40 sends a Wi-Fi sensing request (e.g., a vendor specific Wi-Fi sensing management action frame) to the router 34, at operation 101. As previously described above, the router 34 then performs Wi-Fi sensing to determine human presence in the environment 70, and sends back a Wi-Fi sensing response (e.g., a vendor specific Wi-Fi sensing management action frame) to the STB 10. At operation 102, this Wi-Fi sensing response is received by the event receiver 86.

The application 40 evaluates the Wi-Fi sensing response to determine if there is human presence. At operation 104, the application 40 also checks for television on/off events, such as by checking an output status of an HDMI interface. The application 40 can conclude that the advertisement is not being watched (even if there is human presence in the environment 70 as indicated by the Wi-Fi sensing response or by other events such as remote control activity, human voice presence, etc.) if the television is turned off or if an HDMI cable is disconnected from the television.

Furthermore when the application 40 determines from the events that there is human presence, the application 40 can cooperate with the various ML models to perform human voice inferencing (at operation 106) to determine the feedback of the user with respect to the advertisement, such as positive or negative sentiments of the user towards the advertisement. According to various embodiments, the user's audio may be captured during the playing of the advertisement, such as via a BT microphone on the remote control or via some other audio capture technique/device. The close caption, subtitles, or other text of the advertisement is also captured (e.g., by text processing component 44 of FIG. 2), and stored as advertisement text in the local storage device 29 of the STB 10 or elsewhere (including remotely from the STB 10, such as in some embodiments in which text processing is performed remotely from the STB 10).

The audio of the user is converted into text using the automatic speech recognition ML model, and stored as a user comment. Then, the semantic similarity ML model generates embedded text for the advertisement text and the user comment. The semantic similarity ML model may use a cosine similarity algorithm on this embedded text to determine if the user comment is related to the advertisement text.

If determined by the semantic similarity ML model to be related, the sentiment analysis ML model performs analysis to determine if the user comment is providing positive, negative, neutral, etc. feedback for the advertisement.

In situations when the application 40 determines that there is no human presence or other situation in which the advertisement is not being watched, the application 40 of some embodiments may report this condition and related data to the MSO cloud 92, such as via a MQTT/SNMP/TR-69 protocol or other suitable communication technique. For example, if any of the parameters like remote control key presses, television on/off status, and human body/voice presence are reported negatively, then the application 40 may send an "advertisement is not watched" report and accompanying metadata such as one or more of: PSI tables like PMT and SIT; human voice input data; Wi-Fi sensing input data; remote control key press status; television status; device ID for the STB 10; subscriber ID for the user, etc. The MSO 74 in conjunction with the content provider(s) 78 may in turn use such information to refine/customize the advertisements being delivered to the user, make adjustments in the pricing and payment for advertisement slots, and other actions to improve the delivery of advertisements.

With respect to user feedback (including sentiment) for the advertisement, the application 40 of various embodiments may also report feedback-related information to the MSO 74 via a MQTT/SNMP/TR-69 protocol or other suitable communication technique. For example, if any of the parameters like remote control key presses, television on/off status, and human body/voice presence is detected, thereby indicating that the user has watched the advertisement, then the application 40 may send an "advertisement sentiment" report and accompanying metadata such as one or more of: PSI tables like PMT and SIT; device ID for the STB 10; subscriber ID for the user; sentiment information (e.g., positive or negative), etc. The MSO 74 in conjunction with the content provider(s) 78 may in turn use such information to refine/customize the advertisements being delivered to the user, make adjustments in the pricing and payment for advertisement slots, and other actions to improve the delivery of advertisements.

Referring now to FIG. 6, the router 34 of various embodiments includes the Wi-Fi sensing application 62 previously described above with respect to FIG. 3, system software 135 analogous to the system software 35 previously described above, and a hardware platform 120 analogous to the hardware platform 20 previously described above. The system software 135 may include an OS, device drivers, or other code to support operation of the router with respect to routing/communication functionality and also with respect to Wi-Fi sensing and ML-related operations pertaining to determining user presence and user feedback using one or more ML inference models that operate in conjunction with ML engine(s) and ML algorithms.

The hardware platform 120 may include one or more modems, switches, Wi-Fi circuitry and equipment usable for Wi-Fi communications and Wi-Fi sensing, CPUs, ML engines, and so forth. In some embodiments, some of the capability previously described above with respect to the STB 10, with respect to determining whether a user is watching an advertisement and analyzing the user's feedback, can be provided at the router 34, alternatively or in addition to the STB 10.

The operations performed by the Wi-Fi sensing application 62 of the router 34 may include operation 108 to load (from the MSO 74 and/or the ML inference model source 80) one or more ML inference models 64 of FIG. 3, for example the Wi-Fi sensing ML model. At operation 110, the Wi-Fi sensing application 62 may also regularly receive (from the CSI extraction component 60 of FIG. 3) captured CSI data or other information pertaining to characteristics of the Wi-Fi link 84 with the STB 10 and/or other Wi-Fi links in the environment 70.

At operation 112, the Wi-Fi sensing application 62 may invoke the execution of an ML algorithm that uses the captured CSI data and the Wi-Fi sensing ML model to perform inferencing for human presence. For example, such inferencing may be performed at regular time intervals (such as hourly or other timeframe) to recognize varying Wi-Fi network characteristics and the effect of human and non-human presence on the Wi-Fi network characteristics. In this manner, the Wi-Fi sensing ML model is able to identify and discriminate stationary or moving human presence from non-human objects in the environment 70.

The results of the Wi-Fi sensing can be stored locally at the router 34, so as to keep an updated log of human presence in the environment 70. In some embodiments, the Wi-Fi sensing application 62 initiates Wi-Fi sensing independently of any Wi-Fi sensing request from the STB 10, such that when the STB 10 sends a Wi-Fi sensing request to the router 34 when an advertisement starts playing, the Wi-Fi sensing application 62 can send a Wi-Fi sensing response that provides the most recently stored determination of human presence.

In other embodiments, the Wi-Fi sensing application 62 initiates Wi-Fi sensing in response to receiving (at operation 114) a specific Wi-Fi sensing request (e.g., a Wi-Fi sensing management action frame or other type of signal) from the STB 10, which was sent when the STB 10 detected the start of an advertisement. The result of the Wi-Fi sensing can then be sent to the STB 10 by the Wi-Fi sensing application 62 in a Wi-Fi sensing response (e.g., a Wi-Fi sensing management action frame or other type of signal) so as to inform the STB 10 as to whether human presence was detected or not detected by the Wi-Fi sensing.

Figure 7:
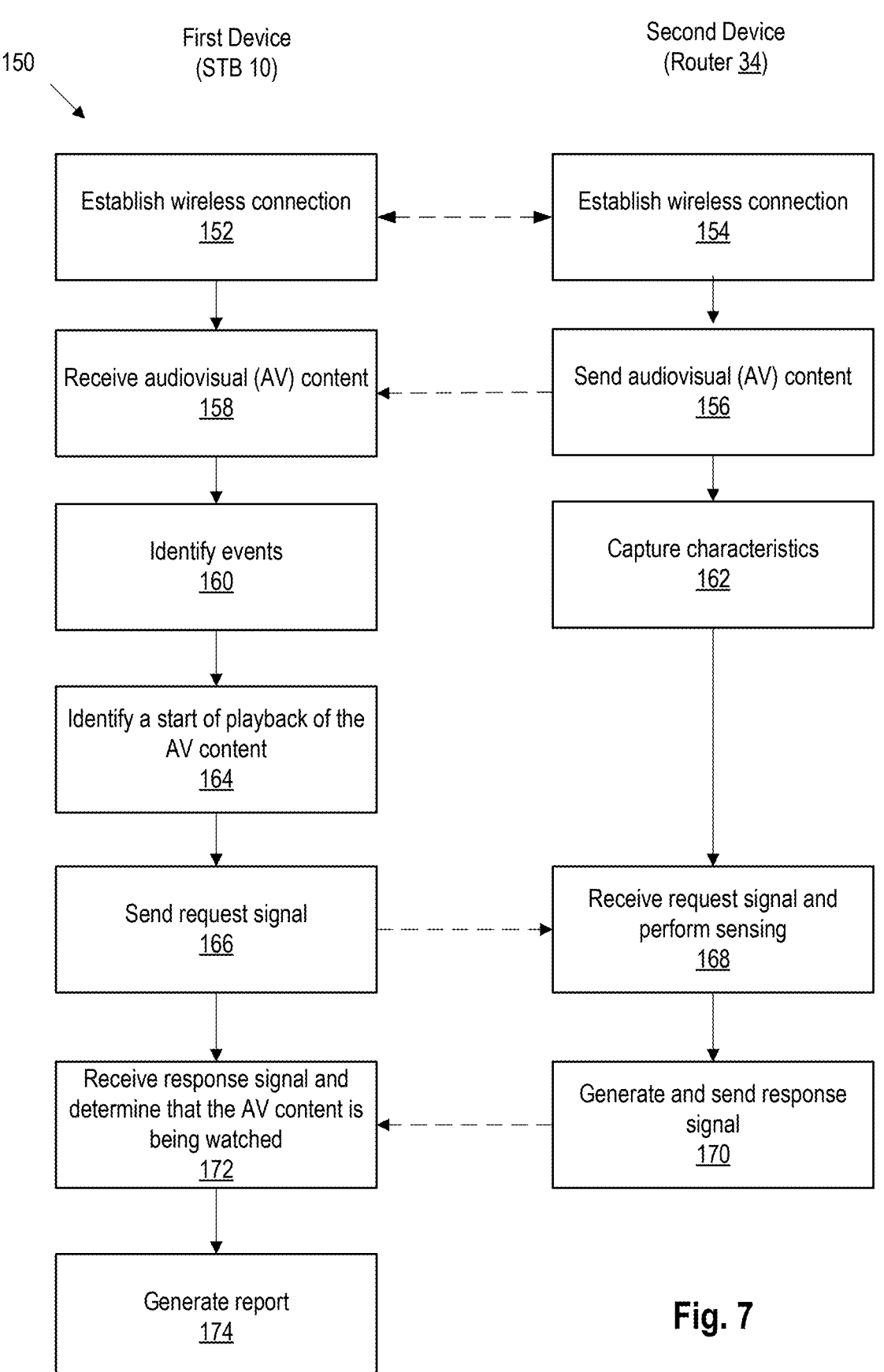
FIG. 7 is a flow diagram depicting a method of performed by a STB and router in connection with determining whether an advertisement has been watched according to embodiments.

FIG. 7 is a flow diagram depicting a method of performed by a STB and router in connection with determining whether an advertisement has been watched according to embodiments. The example method 150 may include one or more operations, functions, or actions illustrated by one or more blocks, which represent steps, operations, acts, etc. The various blocks of the method 150 and/or of any other process(es) described herein may be combined into fewer blocks, divided into additional blocks, supplemented with further blocks, and/or eliminated based upon the desired implementation. In one embodiment, the operations of the method 150 may be performed in a pipelined sequential manner. In other embodiments, some operations may be performed out-of-order, in parallel, etc.

The method 150 is shown and described with respect to a first device such as the STB 10 and a second device such as the router 34, which may communicate with each other via the Wi-Fi link 84 or other wireless connection.

Starting at blocks 152 and 154 ("Establish wireless connection"), the STB 10 and router 154 cooperate to establish a wireless connection (such as the Wi-Fi link 84) between them. The router 34 sends AV content (such as an advertisement) to the STB 10 at a block 156 ("Send audiovisual (AV) content"), and the STB 10 receives the AV content at a block 158 ("Receive audiovisual (AV) content") for presentation by the display device 32 communicatively coupled to the STB 10. In implementations such as for IP STBs or for OTT, the STB 10 may receive the AV content via the router 34. In other implementations such as for cable STBs or satellite STBs, the AV content (including advertisements) may be received via satellite/cable tuners, demodulators, etc. for the STB 10, without necessarily involving a router 34.

At a block 160 ("Identify events"), the STB 10 identifies various events, such as remote control activity, human voice presence, television on/off state, etc. At a block 162 ("Capture characteristics"), the router 34 may capture characteristics associated with the wireless connection, such as CSI data or other analogous information. The router 34 may also perform Wi-Fi sensing at the block 162, using the captured characteristics and the Wi-Fi sensing ML model, to infer presence of the user, for purposes of training or for maintaining a stored updated log of user presence.

At a block 164 ("Identify a start of playback of the AV content"), the STB 10 identifies or otherwise detects a starting of the playback of the advertisement. In response to identifying the start of the playback, the STB 10 sends a request signal (such as a Wi-Fi sensing management action frame) to the router 34, at a block 166 ("Send request signal"), to instruct the router 34 to determine whether the user is present in the environment 70 where the display device 32 is located.

The router 34 receives the request signal and performs sensing (e.g., Wi-Fi sensing) in response to the request signal, at a block 168 ("Receive request signal and perform sensing"). At a block 170 ("Generate and send response signal"), the router 34 generates a response signal that provides a result of the Wi-Fi sensing, such as an inference or other determination of whether the user is present in the environment 70. The router 34 sends this response signal to the STB 10.

At a block 172 ("Receive response signal and determine that the AV content is being watched"), the STB 10 receives the response signal. Based on the response signal indicating that the user is present and based on at least one event previously described above (e.g., human voice presence, remote control activity, television on state, etc.), the STB 10 determines that the advertisement is being watched.

At a block 174 ("Generate report"), the STB 10 generates a report to notify a provider of the advertisement that the advertisement has been watched by the user. Such a provider may be the MSO 74 and/or the content provider 78 (such as an advertiser, vendor, etc.). The STB may send the report to the router 34, which may then send the report to the appropriate provider(s). The STB 10 may also generate and send a report in situations where a determination is made that the user has not watched an advertisement.

Other (subsequent or parallel) operations in the method 150 may be related to analyzing user feedback to determine sentiment. The operations described above for the method 150 can repeat and be performed on a per advertisement basis.

While some processes and methods having various operations have been described, one or more embodiments also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

One or more embodiments may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Boundaries between components, operations, and data stores are somewhat arbitrary, and particular operations are illustrated in the context of specific illustrative configurations. Other allocations of functionality are envisioned and may fall within the scope of the present disclosure. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A first device, comprising:
an antenna to enable the first device to establish a wireless connection with a second device;
a port communicatively coupled to a display device and configured to provide audio visual (AV) content received by the first device to the display device for presentation by the display device;
a processor;
at least one non-transitory computer-readable medium coupled to the processor; and
a program stored on the at least one computer-readable medium and executable by the processor to:
identify a start of playback of the AV content;
in response to identification of the start of the playback of the AV content, send a request signal to the second device via the wireless connection to instruct the second device to determine whether a user is present in an environment where the display device is located;
receive, via the wireless connection from the second device, a response signal that indicates whether the user is present in the environment;
based on the response signal being indicative that the user is present in the environment and based on at least one event identified by the program, determine that the AV content presented on the display device is being watched by the user; and
generate a report to notify a provider of the AV content that the AV content has been watched by the user.

2. The first device of claim 1, wherein the first device comprises a set top box, the second device comprises a router, and the display device comprises a television.

3. The first device of claim 1, wherein the AV content comprises an advertisement.

4. The first device of claim 1, wherein to determine whether the user is present in the environment, the second device is configured to use Wi-Fi sensing in conjunction with a Wi-Fi sensing machine learning model to infer presence of the user in the environment, and wherein the Wi-Fi sensing detects changes in characteristics of the wireless connection that are attributable to presence of the user in the environment.

5. The first device of claim 1, wherein the at least one event identified by the program includes one or more of: detection of a voice of the user during the playback of the AV content, detection of remote control activity before or during the playback of the AV content, and detection of an on state of the display device during the playback of the AV content.

6. The first device of claim 1, wherein based on the response signal being indicative that the user is present in the environment and based on a determination by the program that the display device is in an off state or is disconnected from the first device, the program is executable by the processor to:
determine that the AV content is not being watched by the user; and
notify the provider of the AV content that the AV content was not watched by the user.

7. The first device of claim 1, wherein the at least one non-transitory computer readable medium is configured to store a machine learning model usable by the program to determine whether audio captured in the environment includes a voice of the user, and wherein the at least one event identified by the program includes a determination that the voice of the user is present during the playback of the AV content.

8. The first device of claim 1, wherein the at least one non-transitory computer readable medium is configured to store:
a machine learning model usable by the program to obtain text of a comment of the user during the playback of the AV content;
a machine learning model usable by the program to infer whether the text of the comment of the user is related to text of the AV content; and
a machine learning model usable by the program to infer, from the text of the comment of the user, a sentiment of the user towards the AV content,
wherein the program is further executable by the processor to report the inferred sentiment to the provider of the AV content.

9. The first device of claim 8, wherein the program is executable by the processor to determine that the AV content is being watched by the user based on inference that the text of the comment of the user is related to the text of the AV content.

10. A method performed by a first device, the method comprising:
establishing, by the first device, a wireless connection with a second device;
identifying, by the first device, a start of playback of audio visual (AV) content for presentation by a display device communicatively coupled to the first device;
in response to identifying the start of the playback of the AV content, sending, by the first device to the second device via the wireless connection, a request signal to instruct the second device to determine whether a user is present in an environment where the display device is located;
receiving, by the first device from the second device via the wireless connection, a response signal that indicates whether the user is present in the environment;

based on the response signal being indicative that the user is present in the environment and based on at least one event identified by the first device, determining, by the first device, that the AV content presented on the display device is being watched by the user; and generating, by the first device, a report to notify a provider of the AV content that the AV content has been watched by the user.

11. The method of claim 10, further comprising receiving, by the first device which is a set top box from the second device which is a router via the wireless connection, the AV content for presentation by the display device which is a television.

12. The method of claim 10, wherein sending the request signal to the second device to instruct the second device to determine whether the user is present in the environment comprises sending the request signal to instruct the second device to use Wi-Fi sensing in conjunction with a Wi-Fi sensing machine learning model to infer presence of the user in the environment.

13. The method of claim 10, wherein determining, based on the at least one event, that the AV content presented on the display device is being watched by the user comprises:

determining, based on one or more of: detecting a voice of the user during the playback of the AV content, detecting remote control activity before or during the playback of the AV content; and detecting an on state of the display device during the playback of the AV content, that the AV content is being watched by the user.

14. The method of claim 10, further comprising, based on the response signal being indicative that the user is present in the environment and based on a determination that the display device is in an off state or is disconnected from the first device:

determining, by the first device, that the AV content is not being watched by the user; and notifying, by first device, the provider of the AV content that the AV content was not watched by the user.

15. The method of claim 10, further comprising:

using, by the first device, at least one machine learning model to obtain text of a comment of the user during the playback of the AV content;

using, by the first device, the at least one machine learning model to infer whether the text of the comment of the user is related to text of the AV content;

using, by the first device, the at least one machine learning model to infer, from the text of the comment of the user, a sentiment of the user towards the AV content; and reporting, by the first device, the inferred sentiment to the provider of the AV content.

16. The method of claim 15, wherein determining, based on the at least one event, that the AV content presented on the display device is being watched by the user comprises:

determining, by the first device, that the AV content is being watched by the user based on inference that the text of the comment of the user is related to the text of the AV content.

17. In an environment that includes a first device and a second device, a method performed by the second device to enable the first device to determine whether audiovisual (AV) content is being watched by a user, the method comprising:

establishing, by the second device, a wireless connection between the second device and the first device;

sending, by the second device to the first device via the wireless connection, the AV content for presentation by a display device communicatively coupled to the second device;

capturing, by the second device, characteristics associated with the wireless connection;

receiving, by the second device from the first device via the wireless connection, a request signal that instructs the second device to perform sensing to determine whether the user is present in the environment;

in response to the request signal, performing, by the second device, the sensing by using the captured characteristics and a machine learning model to determine that the user is present in the environment and to generate a response signal that indicates that the user is present; and sending, by the second device to the first device via the wireless connection, the response signal to enable the first device to use the response signal in combination with at least one event to determine that the AV content presented on the display device is being watched by the user.

18. The method of claim 17, wherein sending, by the second device to the first device via the wireless connection, the AV content for presentation by the display device comprises:

sending, by a router to a wireless set top box via the wireless connection, an advertisement for presentation by a television.

19. The method of claim 17, wherein performing the sensing by using the captured characteristics and the machine learning model comprises:

using, by the second device, Wi-Fi sensing to determine changes in the characteristics of the wireless connection that are attributable to presence of the user in the environment.

20. The method of claim 17, further comprising:

receiving, by the second device from the first device via the wireless connection, a report generated by the first device to notify a provider of the AV content that the AV content has been watched by the user; and sending, by the second device, the report to the provider of the AV content.

* * * * *